United States Patent [19]

Shuman

[11] 4,097,035
[45] Jun. 27, 1978

[54] CLAMPING FRAME FOR PLASTIC FORMING APPARATUS

[76] Inventor: Jack N. Shuman, 3330 Foxcroft Rd., Charlotte, N.C. 28211

[21] Appl. No.: 802,133

[22] Filed: May 31, 1977

[51] Int. Cl.$^2$ .............................................. B25B 5/14
[52] U.S. Cl. .................................. 269/121; 269/142; 269/237; 425/388; 425/DIG. 48
[58] Field of Search .............. 425/388, DIG. 48, 400, 425/451.9; 269/88, 55, 111, 94, 121, 58, 140, 59, 141, 142, 216, 237; 38/102.6; 264/92

[56] References Cited

U.S. PATENT DOCUMENTS

| | | | |
|---|---|---|---|
| 2,873,653 | 2/1959 | Wilson | 269/237 X |
| 2,907,069 | 10/1959 | Butzko | 269/237 X |
| 3,841,819 | 10/1974 | Diamond | 269/121 X |
| 4,039,643 | 8/1977 | Dean et al. | 264/92 |

*Primary Examiner*—Robert L. Spicer
*Attorney, Agent, or Firm*—Richards, Shefte & Pinckney

[57] ABSTRACT

An adjustable clamping frame for clamping the peripheral edges of a sheet of plastic material during the plasticizing and vacuum forming thereof, such frame including a first pair of parallel side elements having clamping elements mounted thereon and being selectively adjustable toward and away from one another to vary the spacing therebetween, and a second pair of side elements selectively mountable in any of a plurality of facing slots spaced along the length of the first pair of side elements. Each of the second pair of side elements includes a pair of flat support bars slidable in the aforesaid slots to extend therebetween at each selected position of the first pair of side elements, and a plurality of clamping sub-assemblies selectively mounted in side-by-side relationship on these flat bars, with the clamping sub-assemblies having different predetermined lengths which provide, in selected combinations thereof, a total extending length corresponding generally to the spacing between the first pair of side elements. Preferably, each clamping sub-assembly has clamping elements mounted on a clamping plate that can be variably positioned with respect to the flat supporting bars in a direction perpendicular to the extending length thereof, whereby the positions of the clamping plates on the second pair of side elements can be varied by either relocating the flat bars thereof in the slots of the first pair of side elements or by repositioning the clamping plates with respect to the flat supporting bars.

7 Claims, 6 Drawing Figures

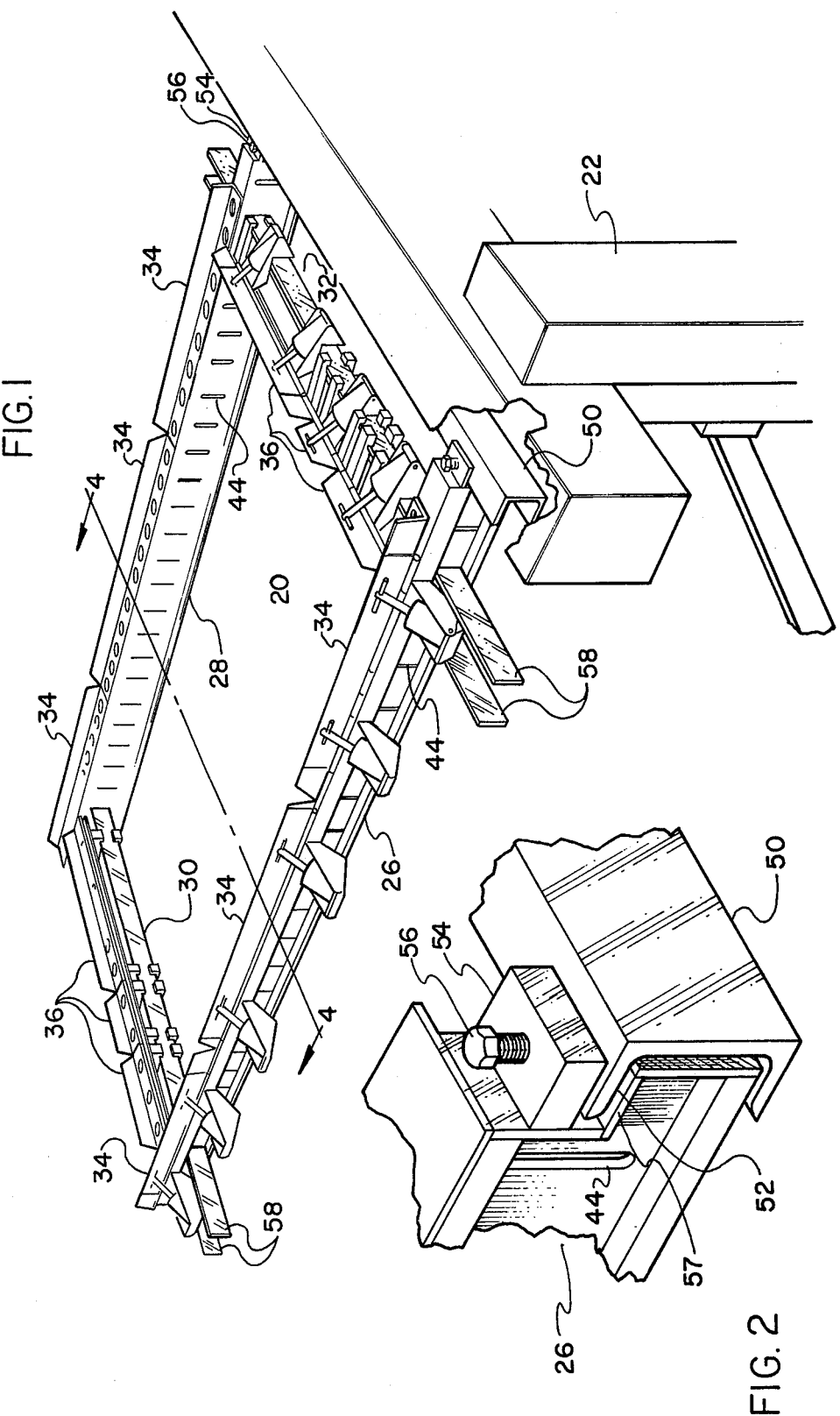

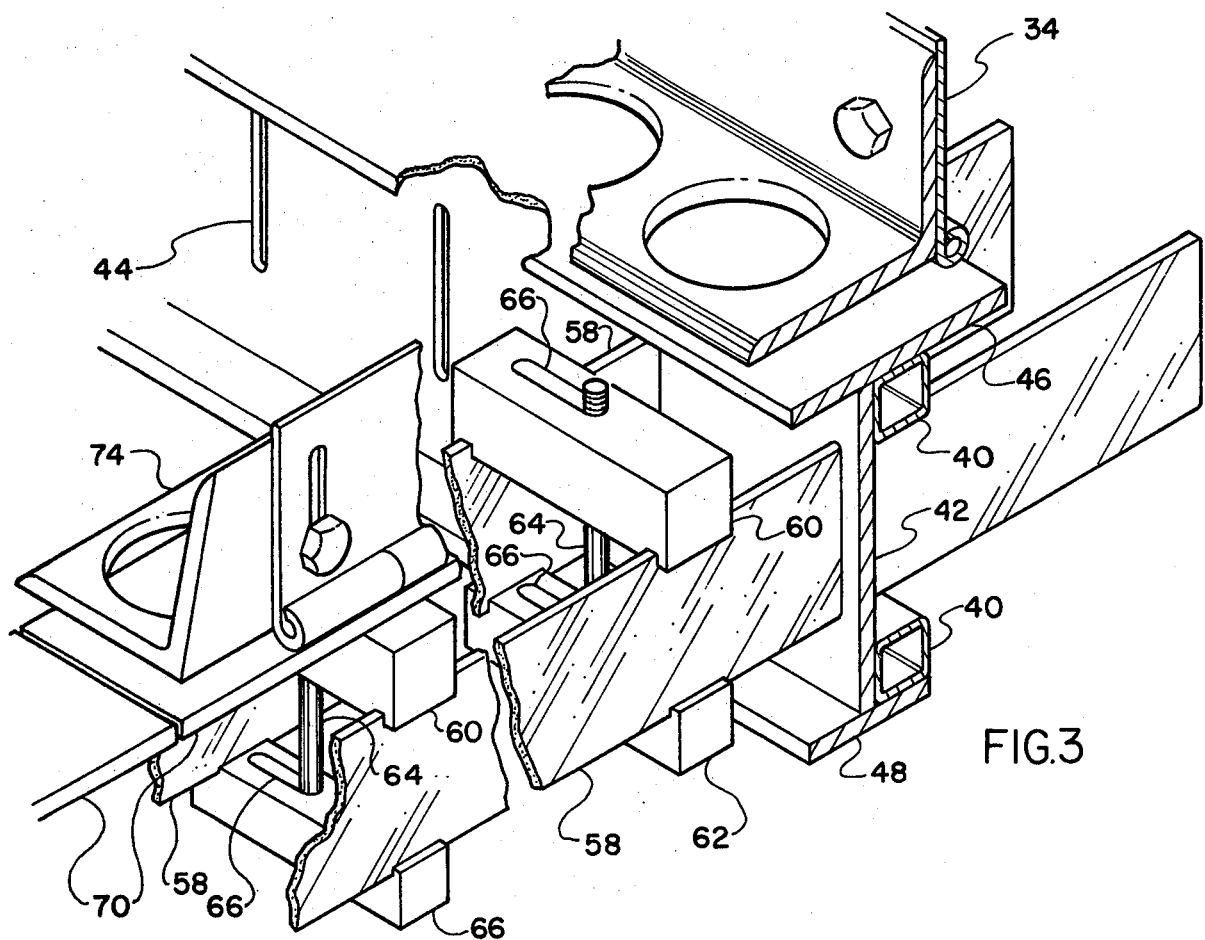
FIG.3
FIG.4
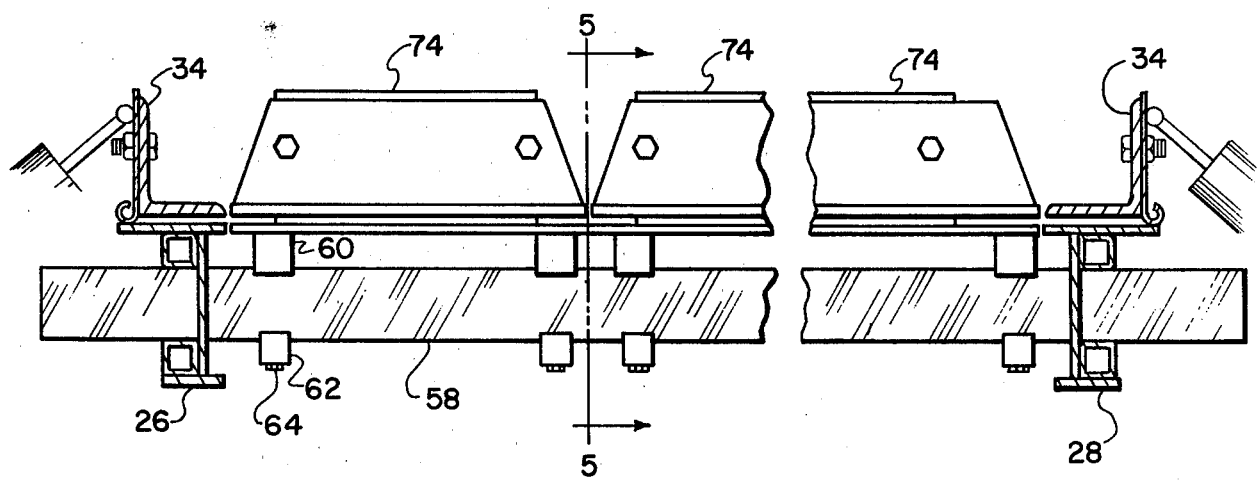

CLAMPING FRAME FOR PLASTIC FORMING APPARATUS

BACKGROUND OF THE INVENTION

Thermoforming plastic sheets of widely varying sizes are commonly supported for plasticizing and for vacuum forming by clamps engaging substantially the entire peripheral edges of the sheets, and the clamps are commonly attached to the sides of a rectangular clamping frame that is adjustable to support the various sizes of plastic sheets. The plastic sheet is vacuum formed over a vacuum-forming mold, and the edges of the sheet must be clamped immediately beyond the periphery of the mold so that it can be lowered beneath the formed top of the mold, thereby pulling the plasticized sheet over the mold for vacuum forming.

A typical known adjustable clamping frame is disclosed in U.S. Patent Application Ser. No. 757,624 and functions well; however, the widthwise sides of the frame are not adjustable in length, but must be manually changed for each substantial change in vacuum-forming mold width. That is, different widthwise frame sides of different predetermined lengths must be provided and substituted for each different width of plastic sheet to be formed. Such substitution is quite satisfactory in some cases, but results in an extensive inventory of widthwise frame sides if more than a few widths of plastic are to be vacuum-formed, and a considerable amount of captial may be invested due to the various construction and clamping elements which must be furnished for each length, as well as the multiplicity of clamp actuating devices used with each. Also, the widthwise frame sides must be completely removed from the frame and be stored elsewhere, while substitute frame sides of different length must be transported from storage and assembled into the frame at each change of plastic sheet width with consequent losses of production time. Normally, a vacuum-molding business would not stock widthwise clamping frame sides for every conceivable plastic sheet width, but would order or construct them as needed, and delays in procurement or construction of particular sizes would handicap the flexibility of the business as well as delay manufacturing operations. While vacuum forming of plastic sheets is best known for its use in manufacturing business signs, conditions have changed with technological progress, and vacuum forming has expanded into many other fields. A very wide variety of sizes and shapes of molds beyond normal sign requirements are now used for vacuum forming such items as casket covers, automobile panels, and many other articles, demanding more flexibility as the uses proliferate.

In accordance with the present invention, the clamping frame is very flexible in terms of being adjustable to support a wide variety of sizes or shapes of plastic sheets, and this flexibility in adjusting the extent of clamping along the widthwise sides is achieved with only a few pairs of clamping elements of relatively small size for ease of selective assembly, while the supports for the clamping elements along the widthwise sides are adaptable for any width and essentially stay in place and form the widthwise frame sides, thus greatly reducing the inventory problems of the prior art frame.

SUMMARY OF THE INVENTION

The clamping frame of the present invention engages the peripheral edges of a sheet of plastic material while it is plasticized and formed into a predetermined configuration over a vacuum-forming mold supported on a forming table, as is well known in the art.

Briefly described, the clamping frame of the present invention includes a pair of lengthwise frame side elements arranged in spaced parallel relationship and having clamping means mounted along their lengths for engaging the side edges of the plastic material, such side elements being arranged for movement toward and away from one another to a plurality of positions at which they have predetermined spacing therebetween. Each lengthwise side element has a plurality of facing apertures formed along its length and extending therethrough for slidably receiving a pair of supports therein to extend between the lengthwise frame side elements at all of the adjusted positions thereof. A plurality of clamping subelements having different predetermined lengths are selectively mountable in side-by-side relationship along and on the extending length of the supports to provide, in selected combinations thereof, a total extending length corresponding generally to the predetermined spacing between the side elements at each of the plurality of positions thereof, and to form, with the supports, the widthwise frame side elements.

Each of the supports of the clamping frame of the present invention preferably includes a pair of flat bars which extend through the apertures (e.g. locating slots) of the lengthwise frame elements, and selected clamping sub-assemblies of predetermined length are secured to these pairs of flat bars by compressor elements connecting mounting plates for edgewise compressive engagement with the flat bars at the opposite edges thereof. The clamping plates may be located at a plurality of positions on each support, with means being provided for selectively varying the positions of each, in a direction perpendicular to the extent of the support, over a distance of at least half the predetermined spacing between each pair of flat bars, this predetermined spacing being determined by the spaced locations of the apertures or locating slots in the lengthwise frame elements for reception of the bars at a plurality of positions.

In the preferred embodiment of the present invention, the lengthwise frame side elements are abutted by the ends of the clamping sub-assemblies adjacent thereto to fix the support means and the clamping sub-assemblies against lengthwise sliding relative thereto. The clamping plates have holes therein for their attachment to the mounting plates by the aforesaid compressor elements which extend through adjustment slots in the mounting plates, such adjustment slots being located between each pair of flat bars. The mounting plates may have grooves therein for receiving the edges of the flat bars.

BRIEF DESCRIPTION OF THE DRAWINGS

FIG. 1 is a perspective view of the preferred embodiment of the adjustable clamping frame according to the present invention;

FIG. 2 is a detail perspective view of one end of the lengthwise frame side shown in FIG. 1;

FIG. 3 is a detail perspective view illustrating the junction of a lengthwise frame side and a widthwise frame side;

FIG. 4 is a partial elevational cross-sectional view of the clamping frame as taken along the line 4—4 in FIG. 1;

DESCRIPTION OF THE PREFERRED EMBODIMENT

Figure 6:
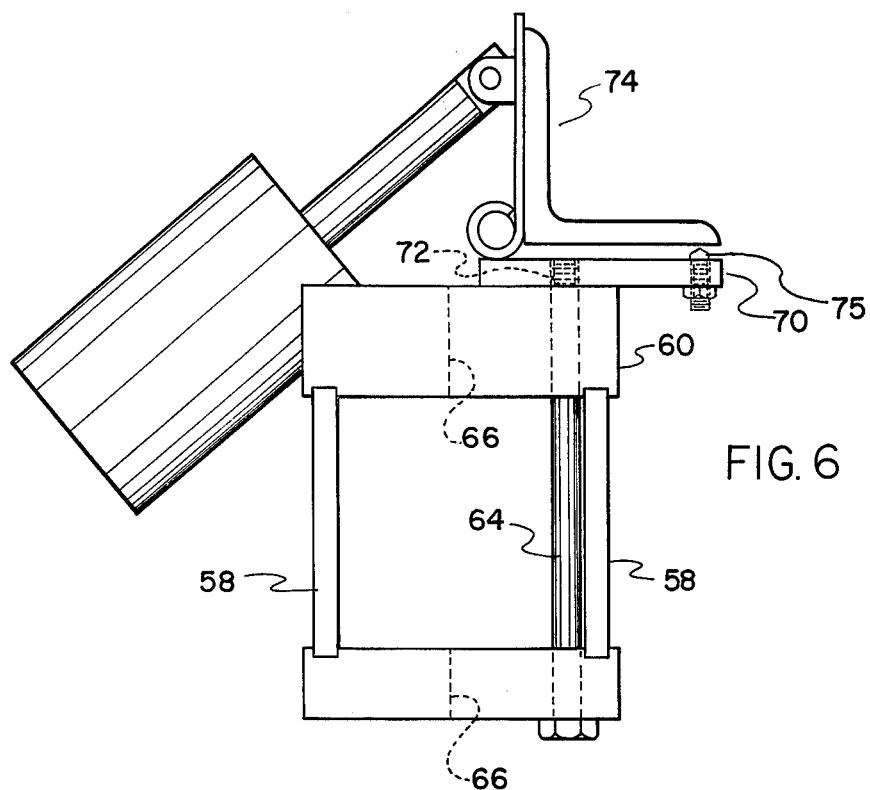
FIG. 6 is a detail view similar to FIG. 5 and illustrating the clamping plate at another adjusted position thereof.

The clamping frame of the present invention is ideally suited for use with plastic forming apparatus as disclosed in U.S. Patent Application No. 757,624, and is an improvement of the plastic material clamping frame disclosed in that application. Since the plastic forming apparatus in general is fully disclosed in that application, reference may be made to such application for details of the plastic forming apparatus. The present disclosure is devoted almost entirely to the improved clamping frame of the present invention, generally indicated by the reference numeral 20.

The clamping frame 20 is mounted on a framework 22, which typically surrounds a platform or forming table member (not shown) for supporting a typical vacuum forming mold (not shown). The frame 20 comprises a pair of lengthwise side elements 26, 28, and a pair of supports 30, 32 extending widthwise of the frame and between the side elements 26, 28. A series of clamps 34 are mounted along the length of the side elements 26, 28 to provide a substantially continuous clamping apparatus for engaging the two corresponding side edges of a sheet of plastic material. A plurality of clamping sub-elements 36, are mounted on the supports 30, 32 to form a substantially continuous clamping apparatus extending along the entire extending length of the supports 30, 32 between the side elements 26, 28 for engaging the other two corresponding side edges of a sheet of plastic material. Therefore, the clamps 34 and the clamping sub-elements 36 provide a means of engaging the entire peripheral edge of a sheet of plastic material during the plasticizing and forming of the plastic sheet into a predetermined configuration according to the particular vacuum forming mold used therewith.

The lengthwise side elements 26, 28 of the clamping frame 20 are comprised essentially of upper and lower tubular members 40 which are joined together transversely by vertically extending plates 42 which are essentially coextensive in length with the tubular members 40 and provide a plurality of apertures 44 in the form of vertical locating slots equally spaced along the length of the side elements 26 and 28. A clamping bar 46 having clamps 34 supported thereon is fixed atop each upper tubular member 40 to form the top of each side element 26, 28 and a base bar 48 is fixed below each lower tubular member 40 to form the bottom of each side element 26, 28, thereby forming a beam member of suitable strength and rigidity for its supporting function.

The framework 22 includes a pair of flanged members 50 for slidably receiving, at the upper flanges 52 thereof, the ends of the side elements 26, 28, as best seen in FIG. 2. Holding ears 54 are affixed at each end of the side elements 26, 28 and carry holding screws 56 for engaging the flanges 52 to hold the side elements 26, 28 at any selected positions thereof along the length of flanged members 50. Thus, the side elements 26, 28 may be moved toward and away from one another to a plurality of parallel positions at which they have a predetermined spacing therebetween to accommodate various widths of plastic sheets for vacuum-forming, and they are held in place thereat by the holding screws 56.

The supports 30, 32 are each comprised of two flat bars 58 which are slidably mounted in selected slots 44 of the side elements 26, 28, and the bars 58 are of suitable length to extend through the slots 44 even at the farthest spacing of side elements 26, 28 permitted by the framework 22. Each pair of the bars 58 is mounted in a corresponding pair of adjacent slots 44 in each side element 26, 28 so as to be located parallel to each other with a predetermined distance therebetween as determined by the spacing of the slots 44.

Since all of the clamping sub-assemblies 36 have the same construction, and may vary only in size as will be described in greater detail below, a description of one clamping sub-assembly 36 will serve to explain the construction of all of the clamping sub-assemblies. As best seen in FIGS. 1 and 3-6, each clamping sub-assembly 36 includes a pair of upper and lower mounting plates 60, 62 which are compressed against the upper and lower edges, respectively, of the flat bars 58 and held in place thereat by compression elements 64, which may consist of bolts extending through aligned adjustment slots 66 in the mounting plates 60, 62. The mounting plates 60, 62 may also be provided with grooves 68 shaped to receive the edges of the bars 58, such grooves 68 having a spacing therebetween that is equal to the spacing between two cooperating flat bars 58 disposed in adjacent slots 44 in the side elements 26, 28. It will be noted in FIGS. 5 and 6 that the location of the slots 66 in the mounting plates 60, 62 is not necessarily equally spaced between the grooves 68, for a purpose which will become apparent presently.

Each clamping sub-assembly 36 also includes a clamping plate 70 supported on the top mounting plate 60, and held in place thereat by the end of the aforesaid compressor bolt 64 being threadably received in a hole 72 formed in the clamping plate 70. The clamping plate 70 has secured thereto a conventional clamp 74 for cooperating with pointed screws 75 which protrude through the upper surface of the clamping plate 70 to hold the peripheral edge of a sheet of plastic.

In use, the frame of the present invention may be readily adjusted to accommodate plastic sheets having a wide variety of different sizes, all without the user being required to maintain a large inventory of individually attached frame sides, as discussed above.

More specifically, and looking at FIGS. 1-4, the operator first determines the interior dimensions for the adjustable frame which will be required for the particular size of the plastic sheet to be molded in a particular operation, as, for example, 3 feet-by-6 feet. Next, the operator places the two pairs of flat bars 58 in selected slots 44 of the side elements 26, 28 so that the spacing between the innermost bars 58 of each pair have a spacing therebetween which corresponds generally to one of the aforesaid required frame dimensions (e.g. 3 feet), and the side elements 26, 28 are then moved toward or away from one another until the spacing therebetween corresponds to the other of the aforesaid required frame dimensions (e.g. 6 feet). It will be noted that when the side elements 26, 28 are moved toward and away from one another, the pairs of flat bars 58 will simply slide in the slots 44 to readily accommodate such movement. Then, a plurality of separate clamping sub-assemblies 36 are selectively mounted in side-by-side relationship on each pair of flat bars 58 to extend along the length thereof, with the total extending length of the clamping sub-assemblies 36 corresponding generally to the aforesaid spacing between the side elements 26, 28. The sub-assemblies 36 are mounted on the flat bars 58 by placing the mounting plates 60, 62 at the edges of the flat bars 58, and securing them in place with the compression bolts 64, as described above.

The user of the present invention will maintain a supply of clamping sub-assemblies 36 having selected and varied predetermined lengths which, when arranged in side-by-side relationship in selected combinations will correspond in total length to virtually any required frame dimension. For example, the user may have in stock pairs of clamping sub-assemblies 36 having each of the following extending lengths: 6 inches, 12 inches, 21 inches, 24 inches, and 27 inches, whereby it is possible to arrive at any combined total length, in 3-inch increments, between 18 inches and 6 feet. Thus, in the example given above where the required frame dimension between the side elements 26, 28 is three feet, the operator could select the two clamping sub-assemblies 36 having dimensions of 12 inches and 24 inches. Moreover, while in most cases it is desirable to have clamping sub-assemblies 36 immediately adjacent one another when they are mounted on the bars 58, it is also possible in many instances to overcome even the small 3-inch increment limitation by having a slight spacing between two or more of the clamp sub-assemblies, with the total dimension of such spacings being less than 3 inches. Thus, if the required frame dimension is 43 inches, it may be feasible to use one 6-inch, one 12-inch, and one 24 inch clamping assembly 36, with a half-inch spacing between each two clamping sub-assemblies to give a total extending length of 43 inches. Also, by such suitable spacing between the clamping sub-assemblies, it is possible to let the ends of the clamping plates 70 lying nearest the side elements 26, 28 abut the side elements 26, 28 so that the flat bars 58 may not shift or slide lengthwise in the locating slots 44.

It is to be understood, of course, that the suggested inventory of particular clamping assembly sizes set forth above is merely exemplary, and other selected size variations may be used in providing the user with a range of combined lengths that is suitable for his particular operation.

Figure 5:
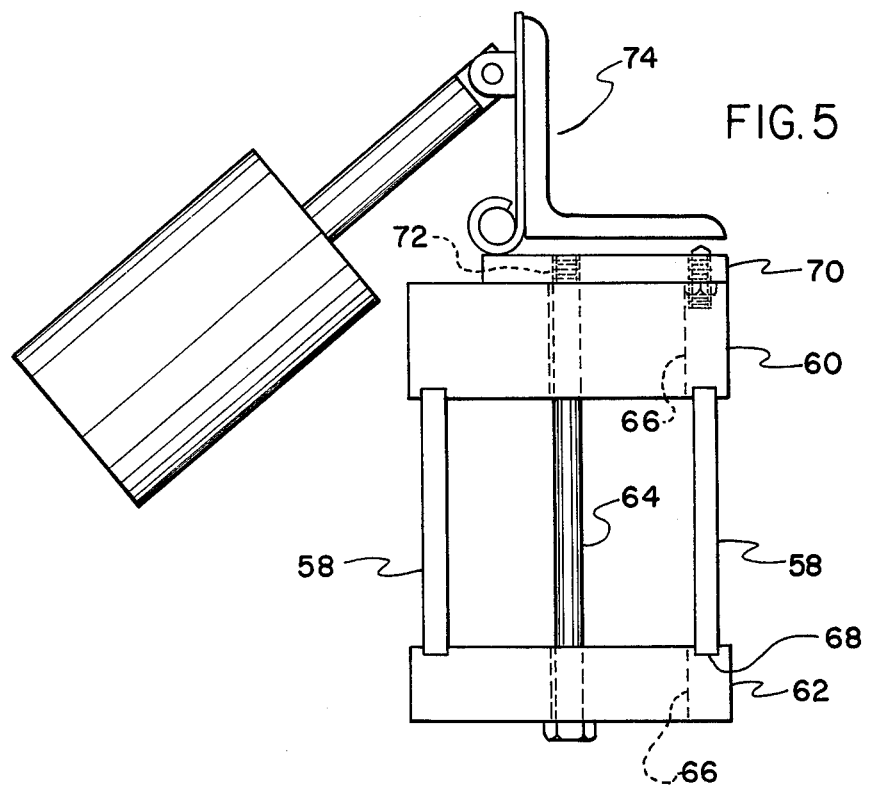
FIG. 5 is a detail view of a widthwise frame side illustrating the clamping plate at one adjusted position thereof.

In accordance with a further feature of the present invention, it is also possible to readily vary the effective spacing between the side elements 30, 32, within certain limits, without repositioning the flat bars 58 in other slots 44. For example, if the spacing between each pair of the slots 44 is 3 inches, then it will be apparent that the spacing between the flat bars 58 and the clamping sub-assemblies supported thereon, may only be varied in 3-inch increments. However, as best seen in FIGS. 5 and 6, the present invention provides a way to vary the effective spacing between the clamping assemblies 36, within this 3-inch increment range. In FIG. 5, the mounting plates 60, 62 are mounted on a pair of flat bars 58 with the compressor bolt 64 located suitably toward the outermost flat bar 58 so that the innermost edge of the clamping plate 70 is generally flush with the innermost edge of the top mounting plate 60. At this position, the spacing between the clamping plates 70 supported on the two pairs of flat bars 58 generally corresponds to the spacing between the innermost flat bars 58 of each pair, which, in turn corresponds to the fixed spacing between the slots 44 in which the innermost bars 58 are carried. However, to adjust the position of the clamping plate 70 with respect to the mounting plate 60, the compressor bolt 64 may be loosened to permit the clamping plate 70 to be repositioned on the mounting plate 60, with the compressor bolt 64 moving within the slots 66, after which the compressor bolt 64 is retightened to hold the clamping plate 70 in place at its new position. Thus, as seen in FIG. 6, the clamping plate 70 may be relocated to a position at which the innermost edge thereof overhangs the edge of the innermost flat bar 58, whereby the clamping plate 70 is now located closer to the corresponding clamping plate 70 mounted on the other pair of flat bars 58 by whatever dimension is desired within the limitation of the length of the adjustment slots 66. The adjustment slots 66 will normally be of such length as to allow movement of the clamping plates 70 through a distance equal to at least half the spacing between the slots 44, so that by adjusting the clamping plates 70 over both pairs of flat bars 58, any desired spacing between the clamping plates 70 may be achieved within the 3-inch incremental adjustments achieved by moving one pair of flat bars 58 into a different pair of locating slots 44. Thus, it will be apparent that the clamping plates 70 can be adjusted toward each other in 3-inch increments by moving one pair of flat bars 58, or they can be adjusted toward each other within said 3-inch increments to any dimension by use of the adjustment slots 66 and the compressor bolts 64. Again, it is to be understood that the 3-inch spacing between the slots 44 and the location and length of the slots 66 between the flat bars is merely exemplary, and other dimensional relationships for these elements could be used. The important aspect of this feature of the present invention is that the clamping sub-assemblies 36 may be readily repositioned as desired within the repositioning increments provided by the spaced slots 44.

Thus, the clamping frame 20 of the present invention provides ready adjustment for peripheral side edge engagement with a sheet of plastic material closely adjacent the side edges of a vacuum forming mold therefor, and it provides a particularly economical and practical construction for the widthwise frame side supports 30, 32 which are adaptable without replacement to any spacing between the lengthwise frame side elements 26, 28. Additionally, the present invention provides economical and easily handled replaceable sets of clamping sub-assemblies 36 for mounting along the length of the widthwise frame side supports 30, 32 between the lengthwise frame side elements 26, 28 with a minimum inventory of different clamping sub-assemblies and a maximum of flexibility.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

I claim:

1. In apparatus for use in forming plastic material into predetermined configurations, the improvement comprising a clamping frame for engaging the peripheral edges of a sheet of plastic material during plasticising and forming of said plastic material, said clamping frame including:

(a) a pair of side elements having clamping means mounted along the length thereof for engaging said peripheral edges of said plastic material, said side elements being arranged in a spaced parallel relationship with each said side element having a plurality of facing apertures formed along the length thereof and extending therethrough;

(b) mounting means permitting said side elements to move toward and away from one another to a plurality of positions at which said side elements have a predetermined spacing therebetween;

(c) a pair of support means slidably mounted in said facing apertures of said side elements to extend therebetween at all said positions thereof; and (d) a plurality of individual clamping sub-assembly means selectively mountable in side-by-side relationship on each said support means along the extending length thereof, said clamping sub-assembly means having different predetermined lengths which provide, in selected combinations thereof, a total extending length along each said support means corresponding generally to said predetermined spacing between said side elements at each of said plurality of positions thereof.

2. In apparatus for use in forming plastic material, the improvement according to claim 1 and characterized further in that the ends of said clamping sub-assembly means adjacent said side elements abut said side elements to fix said support means and said sub-assembly means mounted thereon against lengthwise sliding relative to said side elements.

3. In apparatus for use in forming plastic material, the improvement according to claim 1 and characterized further in that each said support means comprises a pair of flat bars, and each said clamping sub-assembly means includes a pair of mounting plates engaging said flat bars at opposite edges thereof and a compressor element selectively operable to secure said clamping sub-assembly means to said bars in edgewise engagement therewith.

4. In apparatus for use in forming plastic material, the improvement according to claim 3 and further characterized in that said clamping sub-assembly means includes a clamping plate having clamping means supported thereon, said clamping plate being mounted on one of said mounting plates by means for selectively varying the position thereof on said mounting plate in a direction perpendicular to the direction of said extent of said support means.

5. In apparatus for use in forming plastic material, the improvement according to claim 4 and further characterized in that said side element apertures are locating slots and have an equal spacing therebetween with the pair of flat bars of each said support means being received in adjacent locating slots, and in that said position of each said clamping plate on each said clamping sub-assembly means may be varied by said clamping plate mounting means over a distance that is equal to at least half the spacing between said locating slots.

6. In apparatus for use in forming plastic material, the improvement according to claim 5 and characterized further in that said mounting means for said clamping plate includes corresponding adjustment slots located respectively in said associated mounting plates for receiving said selectively attachable compressor element therein, said adjusting slots in said mounting plates being located with respect to said pair of flat bars to which said mounting plates are secured to permit said clamping plate to be selectively positioned on said flat bar.

7. In apparatus for use in forming plastic material, the improvement according to claim 6 and characterized further in that said mounting plates are formed with spaced grooves for receiving the edges of said flat bars.

* * * * *